United States Patent Office 3,435,216
Patented Mar. 25, 1969

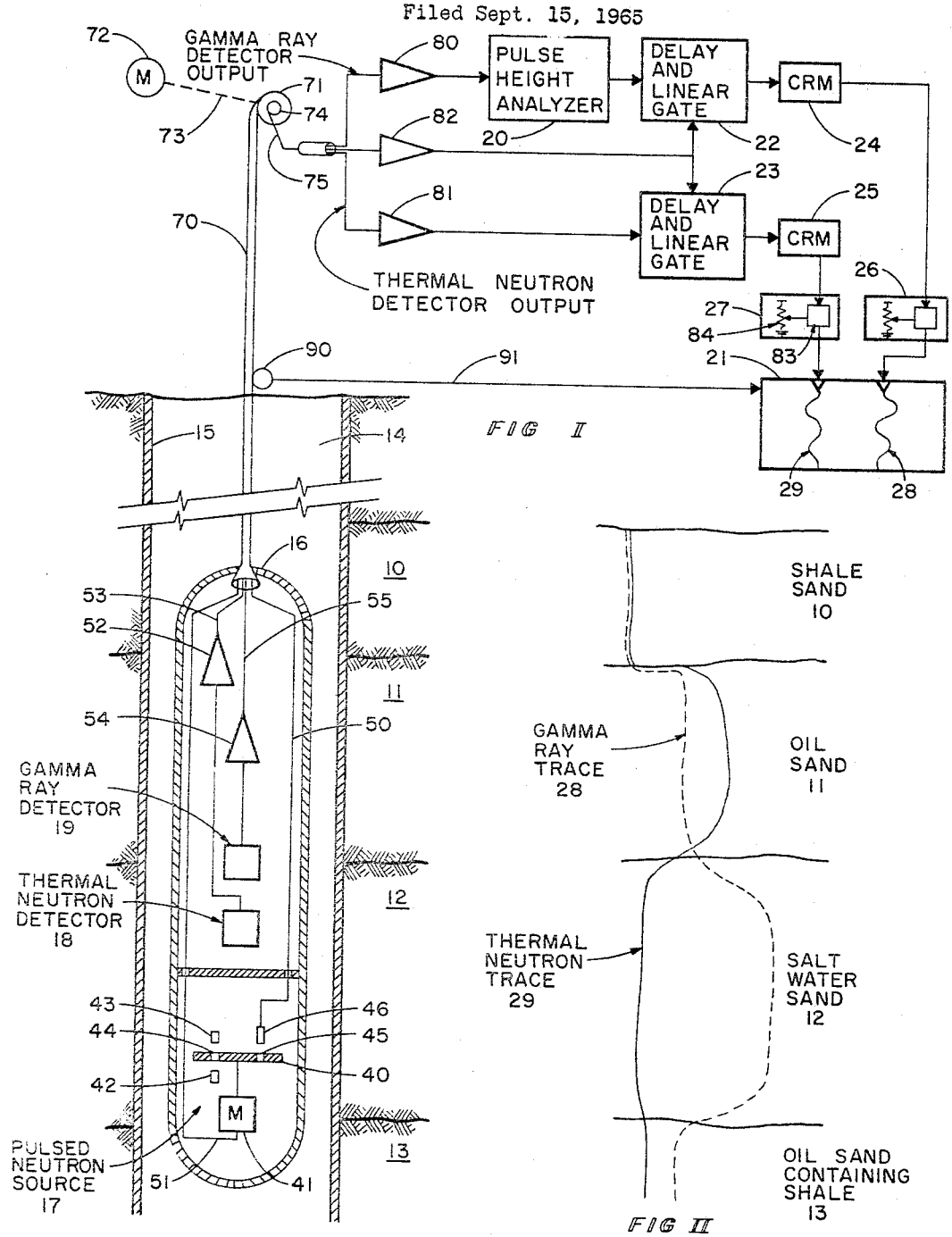

3,435,216
PULSED NEUTRON WELL LOGGING TECHNIQUE AND SYSTEM
Wyatt W. Givens, Dallas, Tex., assignor to Mobil Oil Corporation, a corporation of New York
Filed Sept. 15, 1965, Ser. No. 487,524
Int. Cl. H01j 39/32; G01t 3/00, 1/18
U.S. Cl. 250—83.1                              1 Claim

ABSTRACT OF THE DISCLOSURE

The specification discloses a pulsed neutron well logging technique and system for simultaneously producing continuous logs of thermal neutrons and thermal neutron capture gamma rays, each detected within a time window occurring at a time following each neutron burst whereby the thermal neutrons and thermal neutron capture gamma rays detected are indicative predominantly of formation characteristics. By recording only the higher energy gamma rays detected, the gamma-ray log is made selectively sensitive to chlorine but insensitive to elements in shale, such as boron. The thermal neutron log obtained is sensitive to the total absorption cross section. Preferably, a source is employed which produces a substantially constant number of fast neutrons per burst.

---

This invention relates to a pulsed neutron well logging technique and system wherein thermal neutron and gamma-ray measurements are obtained for distinguishing between the various formations and more particularly to the production, by pulsed neutron operation, of sensitive and accurate continuous logs of thermal neutrons and selective thermal neutron capture gamma rays indicative predominantly of formation characteristics.

In radioactive well logging operations, pulsed neutron systems and techniques are the subject of much investigation due to the high sensitivity achieved compared to steady state logging. Known pulsed neutron operations rely upon semilogarithmic decay curves or upon thermal neutron mean life or half life measurements obtained from thermal neutrons or thermal neutron capture gamma rays detected at least within two time windows spaced between each neutron burst.

In accordance with the present invention, there is provided a unique pulsed neutron logging technique and system wherein simultaneous logs are produced continuously in correlation with depth of thermal neutrons and selective thermal neutron capture gamma rays, each detected within a single time window following the burst of fast neutrons. By employing a source which produces a substantially constant number of fast neutrons per burst, very sensitive and reliable continuous thermal neutron and gamma-ray logs may be obtained for differentiating between the various formations based upon variations of the two logs.

In carrying out the technique of the present invention, the formations are irradicated with bursts of fast neutrons spaced in time. The resulting thermal neutrons and thermal neutron capture gamma rays are detected by suitable detectors. From the thermal neutrons and thermal neutron capture gamma rays detected, there are produced simultaneously two measurements, each having a single value for each depth and representative of the intensities of thermal neutrons and thermal neutron capture gamma rays, detected, respectively, within a single time period spaced from the termination of neutron bursts. Preferably, during logging, the two measuremnts are employed to produce continuous thermal neutron and thermal neutron capture gamma-ray logs in correlation with depth. The time windows are spaced from the end of the neutron bursts whereby the thermal neutrons and thermal neutron capture gamma rays detected therein are indicative predominantly of formation characteristics.

In the embodiment disclosed, the gamma ray measurement is made selectively sensitive to capture gamma rays from chlorine while the thermal neutron measurement obtained is sensitive to the total chemistry effect.

The resulting logs produced have particular application in distinguishing certain oil-bearing sands containing shale from salt-water sands, the former of which have presented problems in pulsed neutron operations wherein reliance is made only upon mean life or half life measurements. In this respect, it has been found that in some instances oil sands may be contaminated with shale from nearby shale formations. It has been found further that such a sand may exhibit the same mean life as a clean sand containing salt water. This is believed due to the presence of elements, such as boron, in shale which readily absorbs thermal neutrons as does chlorine of salt water. Thus, it is impossible to distinguish between such shaly oil sands and salt-water sands on the basis of mean life or half life measurements alone.

The present pulsed neutron logs, however, allow distinction since the gamma-ray log is made selectively sensitive to chlorine but insensitive to elements in shale, such as boron, while the thermal neutron log is sensitive to the total absorption cross section. Thus, the two logs will react differently in the two types of formations, thereby allowing one to distinguish possible oil-bearing sands which otherwise may appear as a salt-water sand to mean life measurements.

For further objects and advantages of the present invention and for a more complete understanding thereof, reference may now be had to the following detailed description taken in conjunction with the accompanying drawings, wherein:

FIGURE 1 represents a pulsed neutron well logging system of the present invention for obtaining the desired logs; and FIGURE 2 represents traces useful in understanding the present invention.

Referring now to FIGURE 1 of the drawings, there will be described the technique and system of the present invention for investigating unknown formations. The formations of interest may be those illustrated at 10–13 traversed by a borehole 14 lined with iron casing 15. In carrying out the method, a borehole tool 16 containing a pulsed neutron source 17, a thermal neutron detector 18, and a gamma-ray detector 19, is lowered into the borehole. The source 17 emits bursts of fast neutrons spaced in time wherein the number of neutrons per burst is substantially constant. These neutrons pass into the formations where they are slowed to the thermal level. Thermal neutrons and thermal neutron capture gamma rays from the formations in turn are detected, respectively, by detectors 18 and 19. The output of the gamma-ray detector is transmitted to the surface to a pulse height analyzer 20 which is adjusted to be selectively responsive only to gamma rays of a certain energy.

The output of the analyzer 20, as well as the output of the thermal neutron detector 18, after transmission to the surface, are applied to a continuous trace recorder 21, respectively, by way of delay and linear gates 22 and 23, count rate meters 24 and 25, and normalizing circuits 26 and 27. Delay and linear gates 22 and 23 are adjusted each for response, respectively, to gamma rays and thermal neutrons detected within a single time window after each burst. The count rate meters 24 and 25 thus produce two measurements, which are recorded by recorder 21 as traces 28 and 29, respectively, and which are representative of the intensity of gamma rays and thermal neutrons detected, each within a single time window following the neutron bursts. Each time window is delayed from the end of each burst of neutrons whereby the thermal neutron capture gamma rays and thermal neutrons measured will be predominantly indicative of formation characteristics and thus uninfluenced to any great extent by borehole fluid. Since the neutron output is substantially constant for each burst, the two traces recorded produce very sensitive and accurate indications of formation characteristics, the gamma-ray trace being selectively sensitive to thermal neutron capture gamma rays while the thermal neutron trace is sensitive to the total chemistry effect.

As mentioned above, the gamma ray measurement preferably is made selectively sensitive to chlorine capture gamma rays in order to allow distinction between shaly oil sands and saltwater sands. This is accomplished by adjusting discriminator 20 for response only to higher energy gamma rays above about 2.3 mev. and preferably from about 4.7 mev. to about 6.2 mev. This adjustment not only discriminates against the prominent 478 kev. gamma rays from boron, suspected to be present in shale, but also against the prominent gamma rays from hydrogen.

Preferably the two traces 28 and 29 are normalized, by adjustment of circuits 26 and 27, with the tool 16 located in a reference shale formation whereby the two traces reflect the same excursion in the reference shale.

Reference may now be had to FIGURE 2 for an understanding of the manner in which the two traces 28 and 29 may be employed for distinguishing between salt sands and oil-bearing sands containing shale. Shale sand 10 has been employed as a reference for normalization, hence the excursions of the two traces are the same therein. In a clean oil sand 11 of lesser porosity and lower macroscopic cross section, both traces reflect an increase in intensity, the gamma-ray trace reflecting a lesser increase due to gamma-ray discrimination obtained with analyzer 20. The salt-water sand 12 is clearly identified by a large increase in gamma-ray intensity and a corresponding decrease in thermal neutron intensity. If the macroscopic absorption cross section of the salt-water sand 12 and the oil sand 13 containing shale are the same, the thermal neutron intensity remains substantially the same as illustrated. The two formations 12 and 13 may be distinguished from each other, however, by reference to the gamma-ray trace which reflects a high intensity in the salt-water sand 12 and a low intensity in the oil sand containing shale. Thus, by relying upon the two sensitive pulsed neutron logs of the present invention, formation 13 can be distinguished from salt-water sand 12 even though the formations may exhibit the same macroscopic cross section.

Although the logs of the present invention provide useful information by themselves, they may be employed to supplement or correct mean life or half life measurements, obtained, for example, from a time decay curve produced by a multichannel analyzer and an X–Y plotter, where quantitative information is desired as described in United States application, Ser. No. 488,137, filed Sept. 17, 1965, by William R. Mills, Jr., and assigned to same assignee as the present invention.

When relying upon the two continuous logs of the present invention alone, it is important that the number of fast neutrons produced per burst be constant, unless accurate corrections are carried out, in order to obtain a true measurement of sought-after radiation intensity variations dependent only upon formation characteristic changes. In this respect, the pulsed neutron source 17 employed is a mechanically actuated alpha-beryllium source, described in co-pending United States application, Ser. No. 396,778, filed Sept. 15, 1964, by Richard L. Caldwell and W. W. Givens. This source reliably produces a substantially constant number of fast neutrons per burst and hence avoids problems of neutron output fluctuation which occur with the commonly employed D–T source. Briefly, the source comprises a shutter 40, rotated by motor 41, between a polonium source 42 and a beryllium target 43. Aperture 44 is provided to obtain bursts of fast neutrons spaced in time upon rotation of the shutter. While only a single source 42 and target 43 and accompanying aperture 44 are disclosed, it is to be understood that a plurality of such sources, targets, and apertures may be employed to increase the neutron yield. The shutter 40 also has a further aperture 45 extending therethrough in order to obtain a sync pulse from a detector 46 which may be a magnetic responsive device. The sync pulse is applied to the surface by way of conductor 50. Energizing power is applied to the motor 41 in turn by way of conductor 51. In certain operations, the neutron source 17 may be pulsed to produce suitable bursts of fast neutrons spaced about 1200 microseconds apart. The repetition rate and length of each burst may be controlled by the speed at which the shutter is driven, the number of sources 42, targets 43, and apertures 44 employed, and in addition by the width of the aperture 44.

The thermal neutron detector 18 may comprise a plurality of heilum-3 detectors at superatmospheric pressure. The outputs of the detectors are applied to the surface by way of amplifier 52 and conductor 53. The gamma-ray detector 19 may comprise a sodium iodide scintillation crystal coupled to a photomultiplier tube whose output is amplified at 54 and applied to the surface by way of cable 55. The two detectors are suitably positioned in the tool to obtain the desired thermal neutron and thermal neutron capture gamma ray measurements.

The borehole tool 16 is moved through the borehole by way of cable 70, wound and unwound upon the drum 71, driven by motor 72, and mechanical connection 73. At the surface, the outputs of the various cable conductors are applied to a plurality of slip rings and brush arrangements, one of which is illustrated, respectively, at 74 and 75. The gamma ray output is amplified at 80 before application to the pulse height analyzer 20, while the thermal neutron output is amplified by amplifier 81 which may include an integral discriminator for discriminating against low level noise. The sync pulse is amplified at the surface at 82, before application to instrumentation including delay and linear gates 22 and 23. Gates 22 and 23 each may comprise a first monostable multivibrator actuated by sync pulses and adjusted for a predetermined time delay for controlling a second monostable multivibrator adjusted to provide the desired time window. The output of the second multivibrator may be coupled to an AND gate which also is coupled to the output of the desired radiation detector for passage of radiation during the time window selected. In one embodiment, the time windows for the thermal neutron and gamma ray measurements each may be of the order of 100 microseconds beginning at a minimum of about 500 microseconds following the end of each neutron burst.

The normalizing circuits 26 and 27 in one embodiment may each comprise a ratio-taking device 83 coupled to a potentiometer 84. Device 83 forms the ratio between the appropriate count rate meter output and the output from the potentiometer. Normalization is carried out by adjustment of the potentiometer of each device whereby the outputs thereof reflect the same excursion in the best shale along the borehole selected as a reference. Shale is preferred as a reference due to its high effective porosity and high thermal neutron absorption cross section.

In one embodiment, the pulse height analyzer 20 may be of the type manufactured by Hamner Electronic Company, Inc., Princeton, N.J., Model N–603.

The recorder 25 may be a conventional two-trace recorder, the chart of which is driven in correlation with depth by a measuring reel 90 and connection 91.

Now that the invention has been described, modification will become apparent to those skilled in the art, and it is intended to cover such modifications as fall within the scope of the appended claim.

What is claimed is:

1. A system for logging the formations traversed by a borehole comprising:
   a logging tool adapted to be inserted into a borehole,
   a neutron source supported in said tool for irradiating the formations with bursts of fast neutrons spaced in time,
   a thermal neutron detector supported in said tool and spaced from said source for detecting thermal neutrons after each neutron burst and resulting from said irradiation,
   a gamma-ray detector supported in said tool and spaced from said source for detecting thermal neutron capture gamma rays after each neutron burst and resulting from said irradiation,
   means for moving said tool continuously through a borehole,
   first time interval selecting means responsive to the output of said thermal neutron detector for producing an output representative of thremal neutrons detected within a first time period spaced from the termination of each of said neutron bursts,
   means responsive to the output of said first time interval selecting means for producing a first measurement representative of the intensity of thermal neutrons detected within said predetermined time period spaced from the termination of each neutron burst,
   energy discriminating means responsive to the output of said gamma-ray detector for producing an output representative of higher energy gamma rays detected within a predetermined energgy range selected to include gamma rays emitted by chlorine upon the capture of thermal neutrons,
   second time interval selecting means responsive to the output of said energy discriminating means for producing an output representative of said higher energy gamma rays detected within a second time period spaced from the termination of each of said neutron bursts,
   means responsive to the output of said second time interval selecting means for producing a second measurement representative of the intensity of thermal neutron capture gamma rays detected within said predetermined energy range and within said second time period spaced from the termination of each of said neutron bursts, and
   means for simultaneously recording said first and second measurements as two continuous traces in correlation with depth.

References Cited
UNITED STATES PATENTS

| 2,991,364 | 7/1961 | Goodman. |
| 3,072,790 | 1/1963 | Hopkinson et al. __ 250—83.1 X |
| 3,205,356 | 9/1965 | Owen. |

ARCHIE R. BORCHELT, *Primary Examiner.*

U.S. Cl. X.R.

250—83.6